United States Patent Office 3,556,992
Patented Jan. 19, 1971

3,556,992
ANISOTROPIC ULTRAFILTRATION MEMBRANE HAVING ADHERING COATING AND METHODS OF FORMING AND USING THIS MEMBRANE
Arthur A. Massucco, Watertown, Mass., assignor to Amicon Corporation, Lexington, Mass., a corporation of Massachusetts
No Drawing. Continuation-in-part of application Ser. No. 704,537, Feb. 12, 1968. This application July 22, 1969, Ser. No. 843,843
Int. Cl. B01d *13/00*
U.S. Cl. 210—23      8 Claims

ABSTRACT OF THE DISCLOSURE

An anistropic ultrafiltration membrane comprising a porous support layer, a less porous barrier layer integral therewith, and an adhering coating of irreversibly compressed gel, said coating adhering to said membrane when in contact with a flowing liquid at a liquid shear rate of about 16,000 sec.$^{-1}$; and method for making same.

---

This application is a continuation-in-part of my co-pending U.S. patent application, Ser. No. 704,537, filed Feb. 12, 1968, for "Anisotropic Membranes," now abandoned.

This invention relates to ultrafiltration membranes, and particularly to ultrafiltration membranes useful for the separation of hemicellulose solutions from caustic hydroxides in waste streams resulting from the treatment of pulp in the paper industry.

Such waste streams normally contain about 7% of caustic soda and typically about 1.3% of such organic impurities as hemicellulose. Disposal of such waste streams not only involves an economic loss with respect to the caustic soda carried in the waste streams but also involves the serious problem of disposing of waste streams without encountering serious pollution problems. Prior separation processes, such as those utilizing dialysis membranes, are relatively slow and hence uneconomical. Other attempts at using membranes have been complicated by the large molecular weight distribution of hemicellulose, which makes it difficult to achieve both a satisfactory high flow rate and efficient material separation.

Ultrafiltration is a process of separation whereby a solution, containing a solute of molecular dimensions significantly greater than the molecular dimensions of the solvent in which it is dissolved, is depleted of the solute by being subject to such pressure that the solvent is forced to flow through a membrane. "Ultrafiltration" is the term preferably used to describe such pressure-activated separations involving solutions of solutes of from about 500 molecular weight and above; the term is also conveniently used for processes involving, instead of dissolved molecules, colloidal-sized particles.

Successful membrane controlled separation processes depend, in major part, upon the characteristics of the membrane utilized. Among the desired characteristics are:

(1) High hydraulic permeability to solvent: The membrane must be capable of transmitting liquid at high rates per unit membrane area under modest pressures.
 (2) Sharp "retention-cut-off". The membrane should be capable of retaining completely, or very nearly completely, all solutes of a molecular weight (or size) above some first specified value and of allowing the passage of all solutes of a molecular weight (or size) below some second value which should be close to the aforesaid first value.
 (3) Good mechanical durability under the chemical and thermal conditions of service. Most preferably, a membrane should be suitable for use in a wide range of chemical and thermal environments.
 (4) A minimum dependence of solvent permeability upon the type or concentration of solute.
 (5) High fouling resistance.

Particularly useful membranes for ultrafiltration are "anisotropic" membranes, which consist of a support layer and a barrier layer, so constructed that the barrier layer will pass less of a given solute than will the support layer. Typically, these membranes are formed of polymers having good mechanical integrity, most advantageously those crystalline and/or glassy thermoplastic polymers known to the art. By crystalline and glassy polymers are meant those materials which possess from about 5 to 50% by weight crystallinity as measured by X-ray diffraction techniques known to the art and/or a glass transition temperature (Tg) of at least about 20° C. Particularly advantageous are polymers of inherently low water sorptivity, which unlike the cellulose acetate materials known to the membrane art may be allowed to dry during storage without losing their beneficial mechanical and processing characteristics. These polymers are those having water-absorptivities of less than about 10% by weight of moisture at 25° C. and 100% relative humidity. Such highly anisotropic membranes are suitably prepared by:

(1) Forming a casting dope of polymer in an organic solvent,
 (2) Casting a film of said casting dope.
 (3) Preferentially contacting one side of said film with a diluent characterized by a high degree of miscibility with said organic solvent and a sufficiently low degree of compatibility with said casting dope to effect rapid precipitation of said polymer, and
 (4) Maintaining said diluent in contact with said membrane until substantially all said solvent has been replaced with said diluent. Preferred anisotropic membranes consist of a macroscopically thick film of a porous polymer (support layer), usually more than about 0.002 and less than about 0.050 of an inch in thickness, and as one surface of this film, an exceedingly thin, but relatively dense barrier layer or "skin" of from about 0.1 to 5.0 microns thickness of microporous polymer in which the average pore diameter is in the millimicron range, for example 1.0 to 500 millimicrons—i.e., about one-tenth to one hundredth the thickness of the skin. The support layer thus comprises a much more coarsely porous polymer structure through which fluid can pass with little hydraulic resistance. When such a membrane is employed as a "molecular filter" with the "skin-side" upstream in contact with fluid under pressure, virtually all resistance to fluid flow through the membrane is encountered in the "skin," and molecules or particles of dimensions larger than the pores in the "skin" are selectively retained. The over-all hydraulic resistance to fluid flow through the membrane is very low, as is the tendency of such membranes to become plugged or fouled. Anisotropic membranes are therefore distinguished from "isotropic" or homogeneous membranes, where flow and plugging or retention properties are independent of flow direction.

It is an object of this invention to provide a high-flow, high-efficiency process for separating material such as hemicellulose from other materials, such as caustic hydroxides.

Another object is to provide improved anisotropic membranes having stable altered permeation characteristics, which are suitable for separating a wide range of preselected polymeric or gel-forming materials, over a broad range of operating pressures.

Another object is to provide an improved ultrafiltration membrane, having filtration characteristics substantially independent of operating pressure.

The invention features an anisotropic ultrafiltration membrane comprising a support layer, a barrier layer integral therewith, and an adhering coating of irreversibly compressed gel, this coating adhering to the membrane when in contact with flowing liquid at a liquid shear rate of about 16,000 sec.$^{-1}$. The membrane is prepared by placing an irreversible-gel forming material in contact with such a membrane in sufficient concentration to form a gel, and, applying liquid pressure at least as high as the desired operating pressure to the membrane sufficient to irreversibly compress the gel into a coating adhering to the membrane even when in contact with flowing liquid at a liquid shear rate of 16,000 sec.$^{-1}$. The resultant membrane will be less permeable (e.g., to gel-forming material) than the untreated membrane, when both are used at the same operating pressure. The invention is therefore useful as a method of carrying out an ultrafiltration of a polymeric gel-forming material to form a new membrane having improved and stable permeability characteristics. The pressure of the liquid feed stream on the upstream side of the anisotropic membrane is increased to a pressure above the desired working pressure and maintained at that elevated level until the flow rate of the gel-forming material through the membrane decreases to a stable or constant value. The pressure of the feed stream may thereafter be dropped without substantially affecting the permeability characteristics created at the higher pressure.

Other objects, features and advantages will be apparent from the following non-limiting example:

EXAMPLE

The membrane-holding cell utilized consisted of a channel 0.031 inch in height, 4.25 inches long, and 0.75 inch wide. The channel was baffled with equally-spaced baffles 0.5 inch wide by 0.125 inch long and 0.031 inch high. The fluid entering the cell was maintained at 60° C. and an average velocity of 21 feet per second, to provide a liquid shear rate of about 16,160 sec.$^{-1}$. Under these operating conditions, a pressure drop of 20 p.s.i. was measured across the cell.

The cell was equipped with an anisotropic membrane formed of a 60:40 polyvinyl chloride-acrylonitrile-copolymer sold under the trade designation XM–50 and characterized by (1) a distilled water flux rate of 140 gallons per square foot per day under an average applied pressure of 40 p.s.i.g. at 25° C. and (2) the ability to reject 100% of a dextran of 100,000 molecular weight from a 1% aqueous solution thereof under an applied pressure of 50 p.s.i.g. The membrane is considered to have an average pore size of from about 5 to 10 millimicrons in a barrier layer about 2 microns in thickness. The barrier layer was arranged to be on the upstream side of the membrane.

The cell was filled with a waste stream, a solution containing 1.2% ($\pm$0.1%) by weight of hemicellulose and 7% by weight of sodium hydroxide. Operation was started by applying an average hydraulic pressure of 41 p.s.i.g. to the cell (upstream side of the membrane). After several hours the flux rate of liquid transmitted through the membrane decreased to a stable rate of about 73 gallons per square foot per day for the remainder of the 24-hour run. About 37% of the hemicellulose present in the input waste stream was rejected, i.e., retained on the feed stream side of the membrane. None of the sodium hydroxide was rejected.

The operating pressure was then elevated to 55 p.s.i.g. At this higher pressure, the waste stream rate again decreased to a stable rate of about 65 gallons per square foot per day and the rejection of hemicellulose rose to 53%.

Surprisingly, when the operating pressure was reduced to 41 p.s.i.g. once again, a hemicellulose rejection of 57% was obtained at a flux rate of 46.5 gallons per square foot per day. This demonstrated that the configuration of the compacted irreversibly-compressible gel at the higher pressure controlled the rejection characteristics of the membrane at pressures below the higher pressure.

After the average operating pressure was raised to 85 p.s.i.g., the flux stabilized at 62 gallons per day per square foot of membrane area. A stable hemicellulose rejection of 82 percent was achieved under these operating conditions. When the pressure was again reduced to 41 p.s.i.g., the rejection rate rose to 83 percent, and the flux dropped to 31.6 gallons per square foot per day at the reduced pressure.

Similarly, after operating the membrane and compressing the gel at an average pressure of 120 lbs. p.s.i.g., it was discovered that the rejections obtainable at 120 p.s.i.g. (about 92%) could also be achieved at operating pressures of 41 p.s.i.g. Still no sodium hydroxide was rejected.

The gel coating may be formed from organic or inorganic gel-forming materials (such as ferric hydroxide and aluminum hydroxide) which are capable of forming irreversibly compressible gels. Irreversibly compressed gels are those which, when formed in accordance with the described process, will provide a coating which cannot be removed when exposed to liquid flows at a liquid shear rate of 16,000 sec.$^{-1}$, even when the pressure at which the gel was compressed is subsequently lowered.

The irreversibly-compressible gels suitable for use in preparing membranes according to the invention are preferably selected from gels that are deformable under less than about 200 p.s.i.g. Such gels should be capable of being carried into contact with the membrane as a solute or colloid in a solvent which has no substantial solvating effect on the membrane during the contacting of the gel therewith and the subsequent compression of the gel. Such gels should, of course, have limited solubility in any liquid to be passed through the membrane in order to avoid being leached therefrom.

Preferred organic materials for forming such gels are polymeric materials having a ratio of weight average molecular weight to number average molecular weight of at least two, and are such that, in non-gel forming concentrations, and in the useable pressure ranges, some lower molecular weight fractions of the material will pass through the untreated membrane, whereas some higher molecular weight fractions will not freely pass through. It is thought that molecules of sizes close to and below the minimum rejected molecule size largely contribute to formation of the coating layer. Among polymeric materials having such a molecular weight ratio characteristic, particularly preferable are synthetic polymers such as hemicellulose, poly (methacrylic acid), polyvinyl alcohol, polyvinyl acetate, and naturally occurring materials, or mixtures thereof producing the desired ratio, such as dextrans, gelatins, and protein-globulin admixtures.

Anisotropic membranes suitable for modification according to the present application may include those fabricated for any of the polymers meeting the characteristics previously set forth. Most advantageously these membranes will have barrier layer pore sizes below about 10 millimicrons. Among such polymers are polycarbonates such as those prepared under the trade designation "Lexan," unplasticized polyvinyl chloride, copolymers of polyvinyl chloride having suitable physical characteristics, the modacrylic polymer sold under the tradename "Dynel" by Union Carbide Corporation, and many other materials which those skilled in the art will be able to select according to the chemical resistance required for their particular process. Such membranes are generally obtainable from Amicon Corporation under the trade designation "Diaflo."

The gel may be formed on the membrane by dissolving a quantity of gel in a suitable solvent, contacting the resultant solution with the membrane and thereafter precipitating the gel with a non-solvent for the gel. On the other hand, the membrane may be subjected to an influx of dissolved gel in a solution of such concentration that the build-up in concentration in contact with the membrane exceeds the solubility of the gel. This latter procedure is particularly useful when hemicellulose is the irreversibly compressible gel to be utilized in the coating.

The pressure to which the membrane is subjected is dependent on the permeation characteristics required; however, preferably this pressure is not greater than the maximum pressure at which the anisotropic membrane may be used without tearing or otherwise destroying the membrane. The process may be operated at any temperature and any concentration of material which will enable formation of a gel and will not adversely affect the properties of the membrane.

Membranes prepared in accordance with the present invention thus have permanently altered permeation characteristics, created by the adhering membrane coating, and may thereafter be used for separating materials other than the gel, so long as no solvent for the membrane coating is introduced.

Other embodiments will occur to those skilled in the art and are within the following claims.

What is claimed is:

1. An anisotropic ultrafiltration membrane comprising a porous support layer, a less porous barrier layer integral therewith, and an adhering coating of irreversibly compressed gel, said coating adhering to said membrane when in contact with a flowing liquid at a liquid shear rate of about 16,000 sec.$^{-1}$.

2. The membrane of claim 1 wherein said gel is formed of a polymeric material having a ratio of weight average molecular weight to number average molecular weight of at least 2.

3. The membrane of claim 2 wherein said polymeric material is hemicellulose.

4. The membrane of claim 1 wherein said gel is compressible at pressures of less than 200 p.s.i.g.

5. The membrane of claim 1 wherein said barrier layer comprises micropores smaller than about 10 millimicrons.

6. A process for making an improved anisotropic ultrafiltration membrane comprising the steps of placing an irreversibly-compressible gel-forming material in contact with the barrier layer of an integral anisotropic ultrafiltration membrane having a support layer and a barrier layer, said contacing gel-forming material being sufficiently concentrated to form a gel, and applying pressure to said membrane sufficient to irrreversibly compress said gel into a coating adhering to said membrane under a liquid shear rate of 16,000 sec.$^{-1}$, whereby the permeability of said membrane to pre-selected materials is reduced.

7. The process as defined in claim 6 wherein said deformation pressure is less than 200 p.s.i.g 8. A process for reducing the amount of polymeric material, of the type having a ratio of weight average molecular weight to number average molecular weight of at least 2, passing through an integral anisotropic ultrafiltration membrane having a support layer and a barrier layer, from the barrier layer side to the support layer side of said membrane, at a predetermined working pressure, comprising the steps of:

allowing said polymeric material to concentrate to form a gel contacting the barrier layer side of said membrane, adjusting the pressure on said membrane above said working pressure to a constant stabilizing pressure sufficient to irreversibly compress said gel, until the flow rate of polymeric material through said membrane substantially stabilizes, and reducing said pressure to said working pressure, whereby the amount of polymeric material is reduced from the amount passing through said membrane at said working pressure prior to treating said membrane with said gel at said stabilizing pressure.

References Cited

UNITED STATES PATENTS

| | | | |
|---|---|---|---|
| 3,228,877 | 1/1966 | Mahon | 210—22 |
| 3,331,772 | 7/1967 | Brownscombe et al. | 210—23 |
| 3,344,928 | 10/1967 | Kraus et al. | 210—500 |
| 3,367,787 | 2/1968 | Thijssen et al. | 210—22X |
| 3,449,245 | 6/1969 | Johnson et al. | 210—23 |
| 3,462,362 | 8/1969 | Kollsman | 210—321X |

OTHER REFERENCES

Polyelectrolyte Complexes, from I. & E. Chemistry, by Alan S. Michaels, vol. 57, No. 10, October 1965, pp. 32–40.

FRANK A. SPEAR, JR., Primary Examiner

U.S. Cl. X.R.

210—75, 193, 321, 490, 500